US012769852B2

(12) United States Patent
Bryant et al.

(10) Patent No.: US 12,769,852 B2
(45) Date of Patent: Oct. 20, 2026

(54) SYSTEMS AND METHODS FOR AUTOMATICALLY GENERATING AND UPDATING DATA SECURITY PARAMETERS USING GENERATIVE ARTIFICIAL INTELLIGENCE

(71) Applicant: BANK OF AMERICA CORPORATION, Charlotte, NC (US)

(72) Inventors: Matthew K. Bryant, Mt. Holly, NC (US); Patricia A. Albritton, Charlotte, NC (US); Natalie Meta Sterling, Fort Mill, SC (US); Nariah Barnes, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 94 days.

(21) Appl. No.: 18/765,757

(22) Filed: Jul. 8, 2024

(65) Prior Publication Data

US 2026/0010641 A1 Jan. 8, 2026

(51) Int. Cl.

| | |
|---|---|
| ***G06F 21/60*** | (2013.01) |
| ***G06F 21/31*** | (2013.01) |
| ***G06N 3/0475*** | (2023.01) |
| ***G06N 3/08*** | (2023.01) |

(52) U.S. Cl.

CPC ............ *G06F 21/604* (2013.01); *G06F 21/31* (2013.01); *G06N 3/0475* (2023.01); *G06N 3/08* (2013.01)

(58) Field of Classification Search

CPC .......... G06F 21/31; G06F 21/60; G06F 21/64; G06F 21/602; G06F 21/6218; G06F 21/6245; G06F 21/6254; G06F 16/951; G06F 16/2477; G06F 11/3006; G06N 3/08; G06N 3/0455; G06N 3/0475; H04L 63/20; H04L 63/083; H04L 63/104; H04L 63/0428; H04L 63/1425; H04L 63/1433; H04L 63/1441

USPC .......................................................... 726/1

See application file for complete search history.

(56) References Cited

U.S. PATENT DOCUMENTS

| | | | |
|---|---|---|---|
| 5,243,652 | A | 9/1993 | Teare |
| 5,694,590 | A | 12/1997 | Thuraisingham |
| 5,778,304 | A | 7/1998 | Grube |
| 5,892,908 | A | 4/1999 | Hughes |

(Continued)

*Primary Examiner* — James N Fiorillo

(74) *Attorney, Agent, or Firm* — Moore & Van Allen PLLC; Lauren M. Stokes

(57) ABSTRACT

Systems, computer program products, and methods are described herein for automatically generating and updating data security parameters using generative artificial intelligence. The present disclosure is configured to identify a historical dataset comprising at least one historical data security parameter; apply the historical dataset to a generative artificial intelligence (AI) engine; train the generative AI engine based on the application; identify at least user input associated with at least one data security vulnerability; identify at least one current security parameter associated with the at least one data security vulnerability; apply the at least one user input, the at least one data security vulnerability, and the at least one current security parameter to the generative AI engine; generate, by the generative AI engine, an updated security parameter for the current security parameter; and automatically update the current security parameter with the updated security parameter.

20 Claims, 7 Drawing Sheets

(56) References Cited

U.S. PATENT DOCUMENTS

| | | | |
|---|---|---|---|
| 5,922,073 | A | 7/1999 | Shimada |
| 5,933,498 | A | 8/1999 | Schneck |
| 6,023,278 | A | 2/2000 | Margolin |
| 6,085,090 | A | 7/2000 | Yee |
| 6,108,365 | A | 8/2000 | Rubin |
| 6,151,631 | A | 11/2000 | Ansell |
| 6,154,172 | A | 11/2000 | Piccionelli |
| 9,311,499 | B2 | 4/2016 | Redlich |
| 10,523,643 | B1 * | 12/2019 | Davis ...................... H04L 63/20 |
| 10,552,645 | B2 | 2/2020 | Krawczewicz |
| 10,769,288 | B2 | 9/2020 | Garcia |
| 10,838,758 | B2 | 11/2020 | Lee |
| 11,030,338 | B2 | 6/2021 | Brown |
| 11,106,768 | B2 | 8/2021 | Sambamurthy |
| 11,134,104 | B2 | 9/2021 | Qureshi |
| 11,190,544 | B2 | 11/2021 | Rieke |
| 11,263,335 | B2 * | 3/2022 | Parthasarathy ... G06F 16/24578 |
| 11,507,948 | B2 | 11/2022 | DeRosa-Grund |
| 11,556,671 | B2 | 1/2023 | Lockhart, III |
| 11,704,427 | B2 | 7/2023 | Fleck |
| 11,886,232 | B2 | 1/2024 | Mahaffey |
| 11,915,087 | B2 | 2/2024 | Espinosa |
| RE49,904 | E | 4/2024 | Fleischman |
| 12,008,117 | B2 | 6/2024 | Smith |
| 2002/0016831 | A1 | 2/2002 | Peled |
| 2002/0143991 | A1 | 10/2002 | Chow |
| 2003/0009594 | A1 | 1/2003 | McElligott |
| 2003/0172036 | A1 | 9/2003 | Feigenbaum |
| 2003/0233431 | A1 | 12/2003 | Reddy |
| 2005/0120101 | A1 | 6/2005 | Nocera |
| 2006/0064374 | A1 | 3/2006 | Helsper |
| 2006/0224663 | A1 | 10/2006 | DiFalco |
| 2007/0043674 | A1 | 2/2007 | DiFalco |
| 2020/0311304 | A1 * | 10/2020 | Parthasarathy ..... G06F 11/3006 |
| 2020/0351298 | A1 * | 11/2020 | Paturi .................... G06Q 10/06 |
| 2022/0198256 | A1 * | 6/2022 | Makhija ................... G06N 3/09 |
| 2022/0217135 | A1 * | 7/2022 | Jarvis ...................... G06F 21/42 |
| 2022/0224706 | A1 * | 7/2022 | Peng ...................... G06N 3/045 |
| 2022/0224723 | A1 * | 7/2022 | Crabtree ............. H04L 63/1441 |
| 2022/0245283 | A1 * | 8/2022 | Springer ............... H04W 12/02 |
| 2023/0208869 | A1 * | 6/2023 | Bisht ........................ G06N 7/01 726/23 |
| 2024/0089242 | A1 | 3/2024 | Gulati |
| 2024/0089292 | A1 * | 3/2024 | Ghosh ................. G06F 21/6218 |
| 2024/0143706 | A1 | 5/2024 | Bacastow |
| 2024/0256678 | A1 * | 8/2024 | Thompson ............ G06F 21/577 |
| 2024/0333746 | A1 * | 10/2024 | Williams ............ G06F 11/3624 |
| 2024/0354840 | A1 * | 10/2024 | Pascal .................... G06Q 40/02 |
| 2024/0396920 | A1 * | 11/2024 | Bonney ............... H04L 63/1433 |
| 2024/0414211 | A1 * | 12/2024 | Boyer ................. H04L 63/1416 |
| 2025/0150474 | A1 * | 5/2025 | Jones ...................... G06F 21/60 |
| 2025/0238662 | A1 * | 7/2025 | Sengupta ............. G06N 3/0475 |
| 2025/0310378 | A1 * | 10/2025 | Agrawal ................ H04L 63/20 |

* cited by examiner

SYSTEMS AND METHODS FOR AUTOMATICALLY GENERATING AND UPDATING DATA SECURITY PARAMETERS USING GENERATIVE ARTIFICIAL INTELLIGENCE

FIELD OF THE INVENTION

The present invention embraces a system for automatically generating and updating data security parameters using generative artificial intelligence.

BACKGROUND

In large networks with many user devices connected, applications installed, and new applications being installed every day, it becomes difficult to maintain up-to-date and relevant surveys on security measures used for each of these user devices, programs, and applications, and maintain up-to-date security parameters and measures to prevent security vulnerabilities. Thus, there exists a need for a system that can automatically, dynamically, and efficiently generate and update data security parameters using generative artificial intelligence.

Applicant has identified a number of deficiencies and problems associated with updating security parameters regularly, automatically, and dynamically. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automatically generating and updating data security parameters using generative artificial intelligence. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify a historical dataset comprising at least one historical data security parameter; apply the historical dataset to a generative artificial intelligence (AI) engine; train the generative AI engine based on the application of the historical dataset to the generative AI engine; identify at least user input associated with at least one data security vulnerability; identify at least one current security parameter associated with the at least one data security vulnerability; apply the at least one user input, the at least one data security vulnerability, and the at least one current security parameter to the generative AI engine at a current instance; generate, by the generative AI engine at the current instance, an updated data security parameter for the current security parameter; and automatically update the current security parameter with the updated data security parameter.

In some embodiments, the at least one user input comprises a feedback input at a feedback survey, and wherein the feedback survey is generated by the generative AI engine. In some embodiments, executing the computer-readable code is further configured to cause the at least one processing device to: apply the historical dataset to the generative AI engine, wherein the historical dataset comprises at least one historical feedback survey and at least one historical feedback input; train the generative AI engine with the historical dataset; and generate, by the generative AI engine, the feedback survey associated with the at least one user input.

In some embodiments, the historical dataset comprises external data security standards and internal data security standards.

In some embodiments, the automatic update of the current security parameter comprises a pre-determined update time.

In some embodiments, the automatic update of the current security parameter is in real time or near real time to the identification of the at least one data security vulnerability.

In some embodiments, executing the computer-readable code is further configured to cause the at least one processing device to: generate a security parameter log comprising the historical dataset, a plurality of historical data security vulnerabilities associated with a plurality of data security parameters; and determine, by the generative AI engine, a context of plurality of data security vulnerabilities and plurality of data security parameters.

In some embodiments, the at least one data security vulnerability is associated with a threat actor identifier, and wherein the at least one user input is based on a feedback survey generated for the threat actor identifier.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
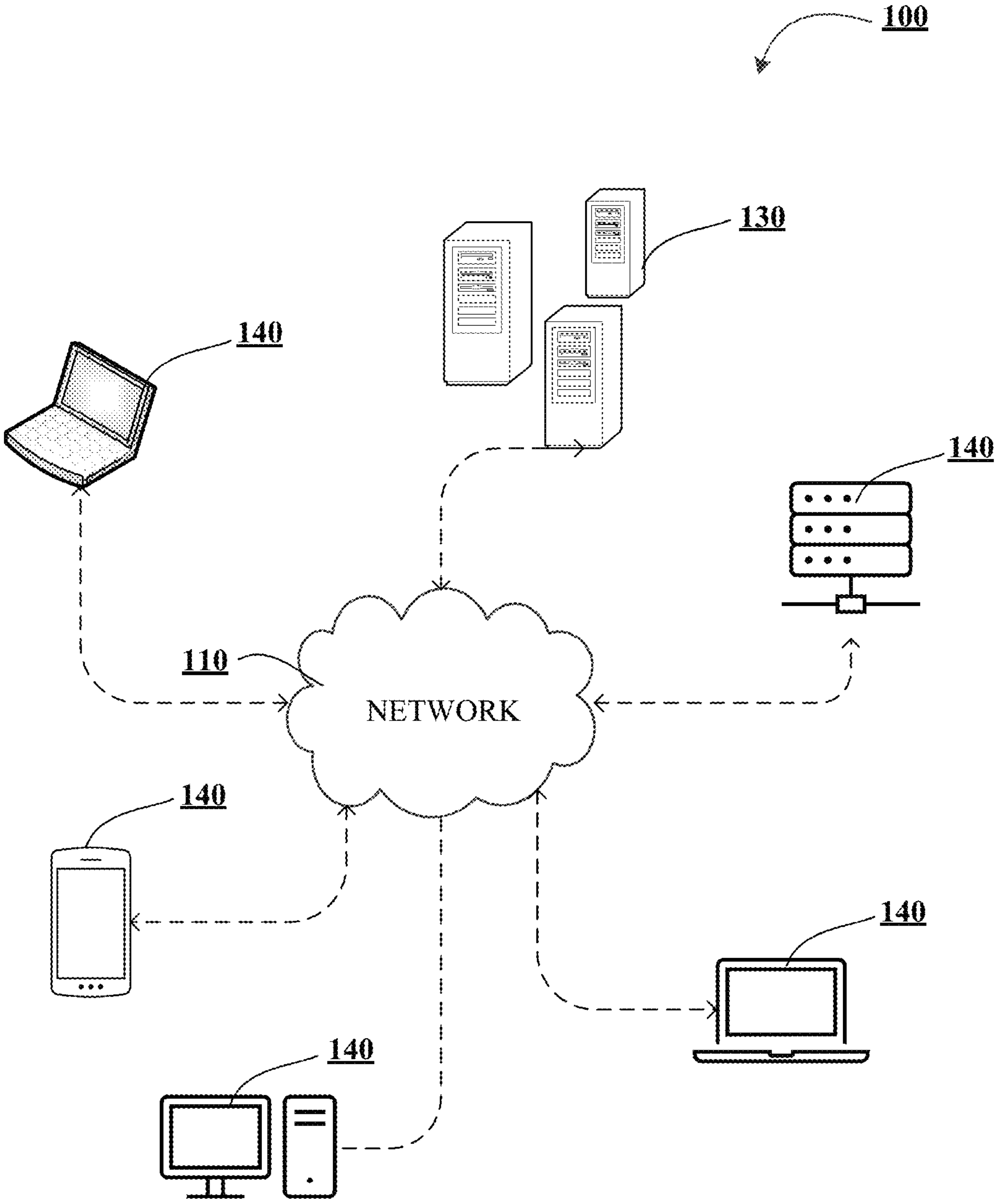
Figure 1B:
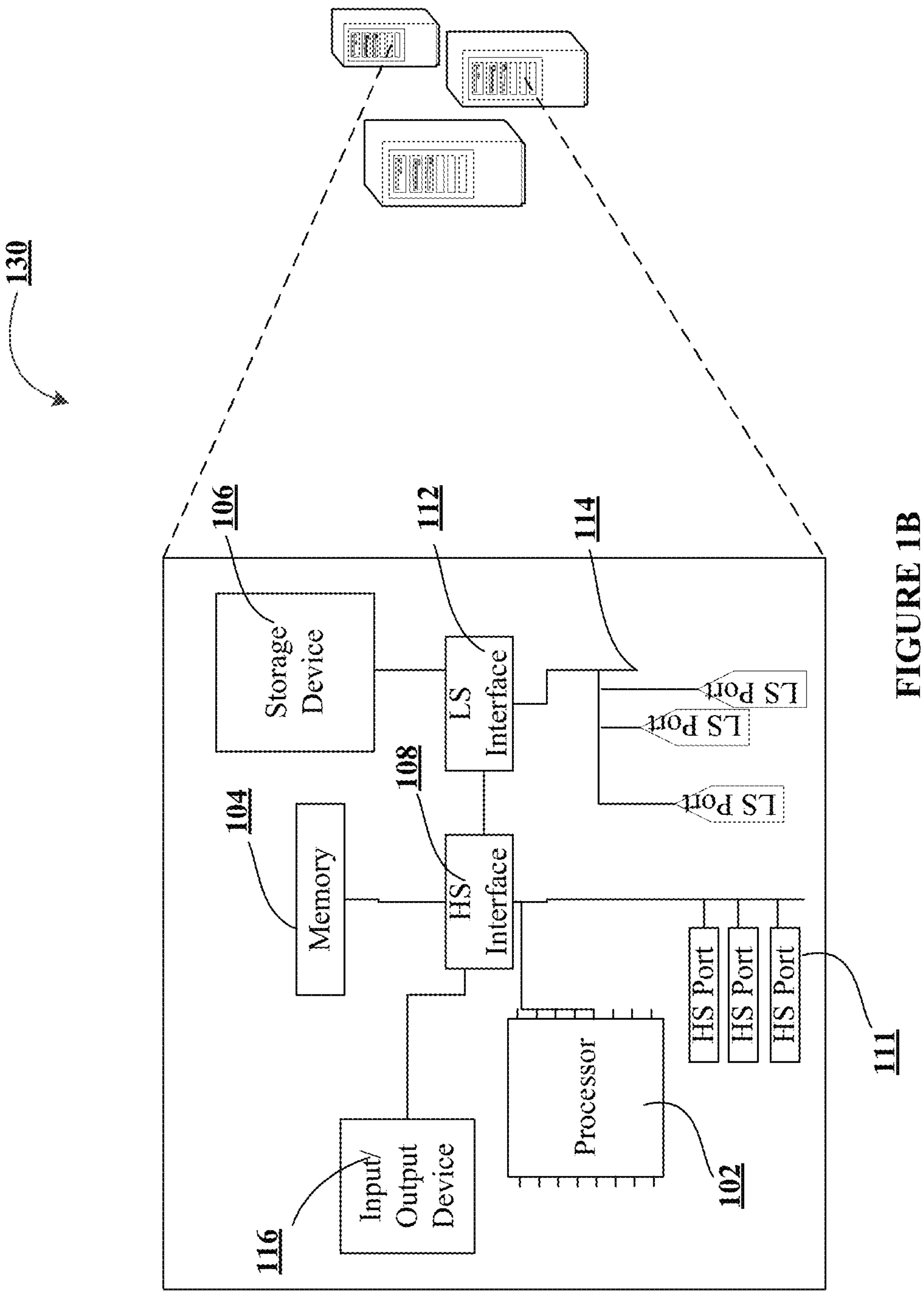
Figure 1C:
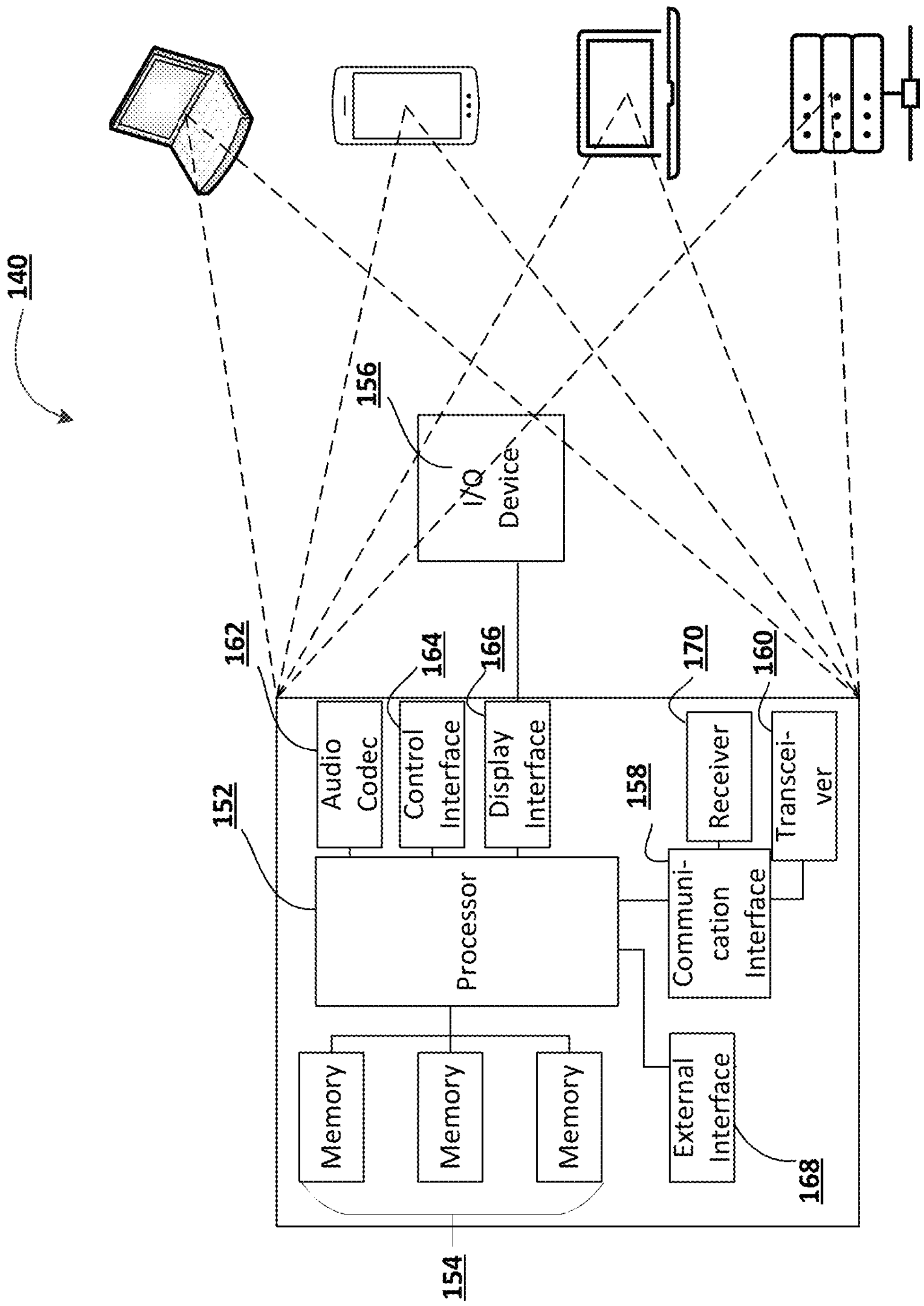
Figure 2:
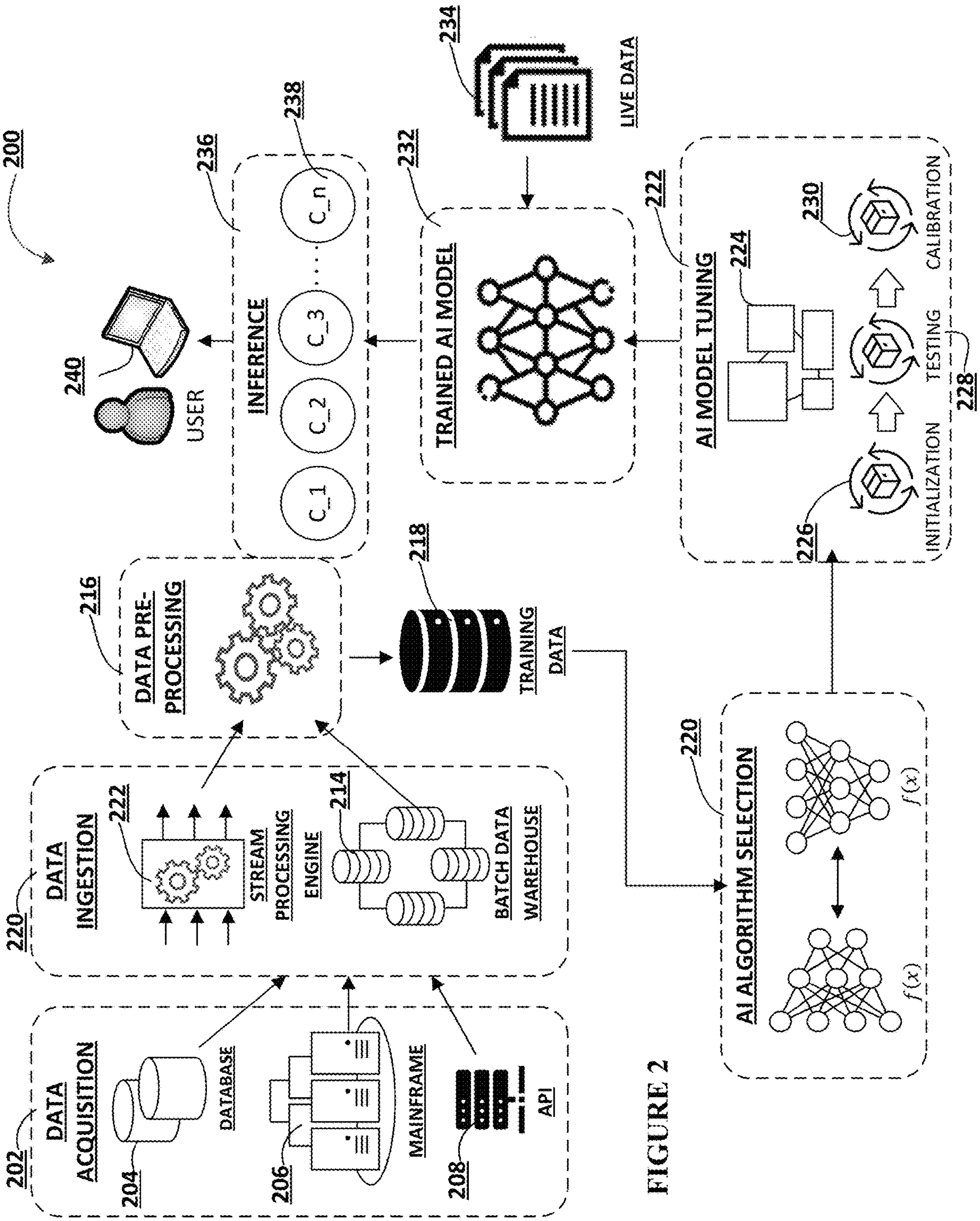
Figure 3:
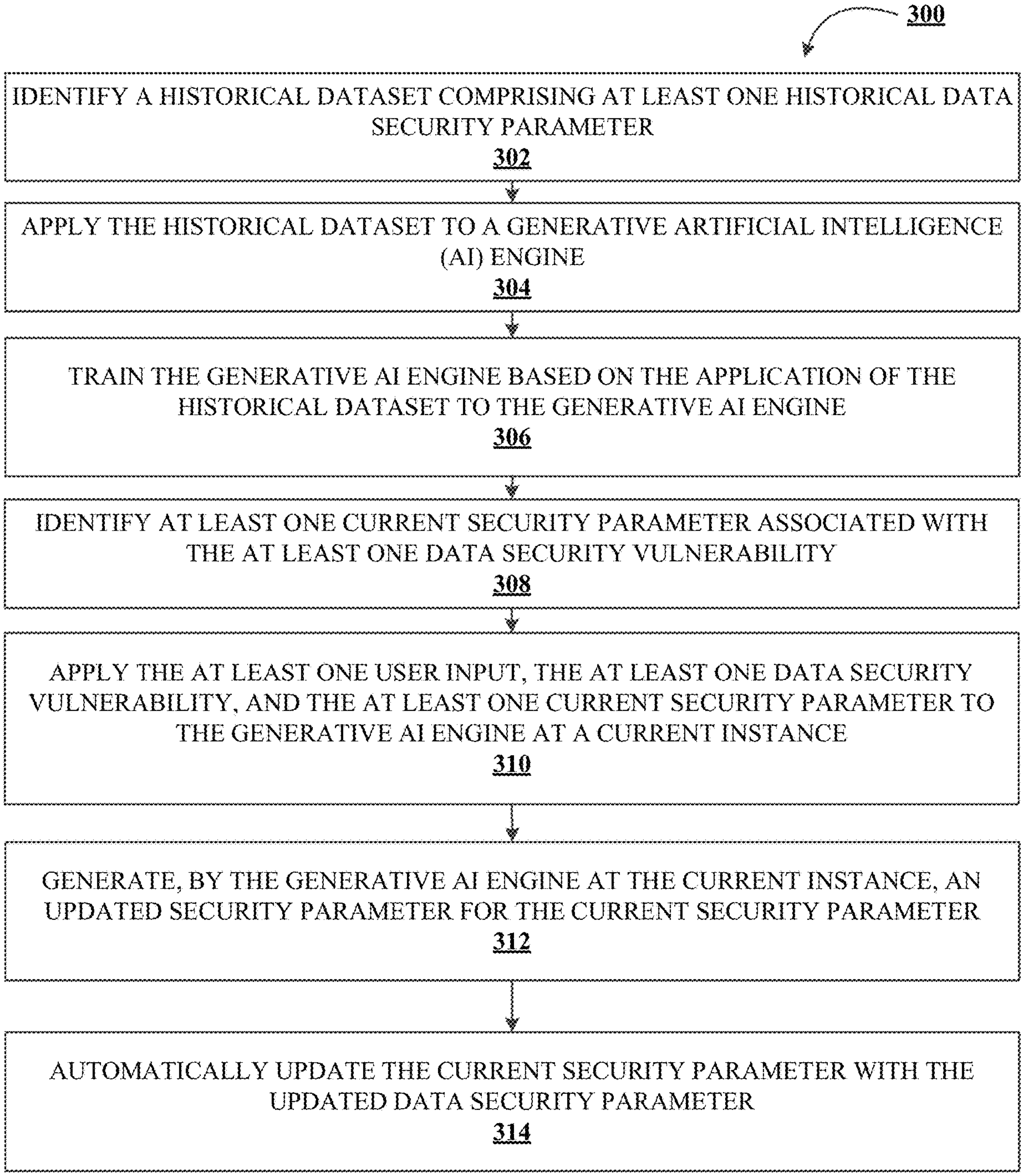
Figure 4:
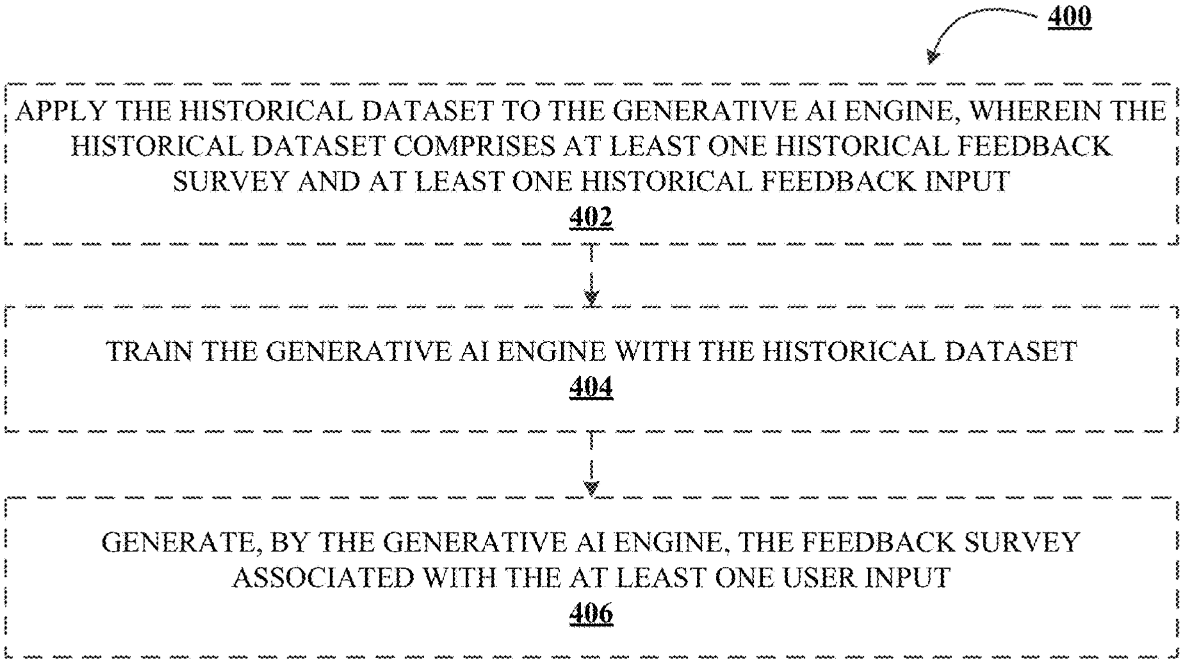
Figure 5:
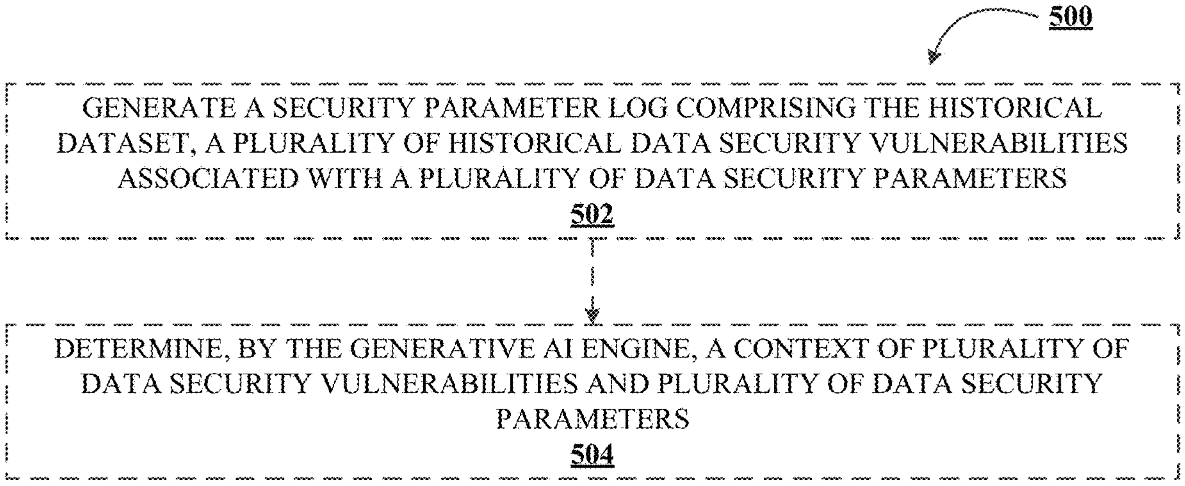

Having thus described embodiments of the invention in general terms, reference will now be made the accompanying drawings, wherein:

FIGS. 1A-1C illustrates technical components of an exemplary distributed computing environment for automatically generating and updating data security parameters using generative artificial intelligence, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for automatically generating and updating data security parameters using generative artificial intelligence, in accordance with an embodiment of the disclosure;

FIG. 4 illustrates a process flow for generating a feedback survey associated with the at least one user input, in accordance with an embodiment of the disclosure; and FIG. 5 illustrates a process flow for determining a context of a plurality of data security vulnerabilities and plurality of data security parameters, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In large networks with many user devices connected, applications installed, and new applications being installed every day, it becomes difficult to maintain up-to-date and relevant surveys on security measures used for each of these user devices, programs, and applications, and maintain up-to-date security parameters and measures to prevent security vulnerabilities. Thus, there exists a need for a system that can automatically, dynamically, and efficiently generate and update data security parameters using generative artificial intelligence.

By way of non-limiting example, large commercial institutions continuously face challenges in maintaining up-to-date and relevant security questionnaires for both internal assessments and third-party evaluations. The current systems often rely on static questionnaires that do not adequately reflect the latest cybersecurity threats, compliance standards, or organizational changes. Additionally, tracking the historical modifications of these questionnaires and ensuring they address specific areas of concern without overwhelming the users with unnecessary information remains problematic.

Accordingly, the present disclosure provides for an identification of a historical dataset comprising at least one historical data security parameter; an application of the historical dataset to a generative artificial intelligence (AI) engine; a training of the generative AI engine based on the application of the historical dataset to the generative AI engine; an identification of at least user input associated with at least one data security vulnerability; an identification of at least one current security parameter associated with the at least one data security vulnerability; and an application of the at least one user input, the at least one data security vulnerability, and the at least one current security parameter to the generative AI engine at a current instance. Additionally, the present disclosure further provides for a generation, by the generative AI engine at the current instance, of an updated data security parameter for the current security parameter, and an automatic updating of the current security parameter with the updated data security parameter.

Thus, and in other words, the disclosure provides a system uses a Generative AI (Gen AI) model that accesses and integrates up-to-date information from recognized cybersecurity standards (e.g., ISO, O-OS) and internal institution data to dynamically generate questions tailored to current security and compliance needs. It features automatic updates, potentially on a monthly basis or as significant events are detected by the Gen AI, ensuring that questionnaires always reflect the most current standards and information without requiring manual intervention. The system includes a historical tracking and analysis feature that logs all changes and updates, facilitating an understanding of the evolution of specific security concerns over time. Additionally, the generative AI engine is capable of filtering out unnecessary information, allowing assessors to focus on critical areas, which prevents information overload and enhances assessment efficiency. The system also integrates incidents and infractions involving third-party entities identified through internet and document scouring, tailoring questionnaires to address specific third-party threats. Each year, the system may adapt the questionnaire based on the previous year's findings, current trends, and incidents identified by the AI, maintaining continual relevance and responsiveness to the evolving security landscape.

Importantly, the disclosure introduces a dynamic and adaptive questionnaire system for security assessments within large commercial institutions, leveraging Generative AI (Gen AI). This system automatically updates and customizes questionnaires by integrating the latest relevant data from both internal institution records and external resources. The Gen AI is programmed to identify and incorporate significant cybersecurity developments, compliance updates, and changes within the assessed entities, ensuring that the questionnaires remain current and focused.

What is more, the present invention provides a technical solution to a technical problem. As described herein, the technical problem includes updating security parameters regularly, automatically, and dynamically. The technical solution presented herein allows for automatically, dynamically, and efficiently generating and updating data security parameters using generative artificial intelligence. In particular, the disclosure provided herein is an improvement over existing solutions to updating security parameters regularly and pre-emptively before cybersecurity threats are realized in a network or on a user device, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for automatically generating and updating data security parameters using generative artificial intelligence 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236. Additionally, and as used herein, the AI engine subsystem architecture described and shown herein may be used to further describe and show the technical components and training of a generative AI engine. Further, and in some embodiments, the disclosure provided herein for the technical components of this AI engine may additionally be used as a base for a large language model (LLM) which may be trained on large sets of data (such as the data described herein for the subsystem architecture 200 and/or the data described herein with respect to FIGS. 3-6). Thus, such an LLM may be configured—using the AI engine—to recognize and generate text, and other such natural language processing tasks (e.g., classification, context, and/or the like).

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for automatically generating and updating data security parameters using generative artificial intelligence, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 300.

As shown in block 302, the process flow 300 may include the step of identifying a historical dataset comprising at least one historical data security parameters. For example, the historical dataset refers to a dataset of historical cybersecurity survey questions (such as questions relating to the setup of applications and programs and their associated potential data security vulnerabilities) and/or historical data security parameters (of the applications and programs that may have been or attempted to have been installed on a user device or in an entity's network, and/or the data security parameters of the network and user devices themselves) to prevent cybersecurity threats. In this manner, the historical dataset may refer to and comprise the data and information surrounding the applications and programs installed at a user device and/or a plurality of user devices within a network, the historical cybersecurity threats of those applications and programs, the surveys presented before installing the applications and programs and the questions of each survey, and whether any different questions may have been asked that would have identified the potential cybersecurity threats of the applications and programs proactively.

Further, and in some embodiments, the system may identify the historical dataset based on accessing a database of past or historical applications that were installed on the user device(s) in an entity's network, whereby the database may further comprise data on cybersecurity threats that affected the historical applications and programs during or after installation. In some embodiments, the database comprising the historical dataset may further comprise human or computer-generated questions that could have been asked to an installer and/or a manager of the entity before installation of each application or program that may have pre-emptively identified the potential cybersecurity threat(s) that affected the application and/or program. Additionally, and in some embodiments, the database may comprise the at least one historical data security parameters that were already set up before application(s) and/or program(s) was installed, any historical data security parameters that were later set up after the application(s) and/or program(s) was installed (which may have been in response to an identified cybersecurity threat), and/or the like.

Additionally, and/or alternatively, the historical dataset may comprise external data security standards and internal data security standards. For example, such external data security standards may comprise recognized cybersecurity parameters such as but not limited to ISO, O-OS, and/or the like, and other such international or national standards for information and data security which may provide a framework for managing sensitive information. Further, and for example, the internal data security standards may comprise but are not limited to entity data and protocols, entity survey questions which may have been tailored to historical security and compliance needs.

As shown in block 304, the process flow 300 may include the step of applying the historical dataset to a generative artificial intelligence (AI) engine. For instance, the system may apply the historical dataset to a generative AI engine to train the generative AI engine on the data of the historical dataset. In this manner, the generative AI engine may be trained on the programs and applications that have previously been installed, the cybersecurity threats that affected some or all of these applications or programs, the types of cybersecurity threats, the questions that should have been raised to determine these cybersecurity threats on the front-end and before installation, the data security parameters that were already installed at the time of the application or program installation, and/or the data security parameters that were installed after a cybersecurity threat was identified for the application or program.

As shown in block 306, the process flow 300 may include the step of training the generative AI engine based on the application of the historical dataset to the generative AI engine. Thus, and in this manner, the generative AI engine may be pre-trained at least once, or a plurality of times with a plurality of historical datasets at different instances, to allow the generative AI engine to new or updated data security parameters based on current applications or programs that may be installed at a future time and/or new questions that should be asked before installation of the applications and/or programs, which the user inputs to these questions may be used by the generative AI engine to test the applications or programs for potential cybersecurity threats and solutions before the cybersecurity threat is actually realized in the network (i.e., actually occurring in the network after installation). Such use of the generative AI engine, after at least this initial training, is discussed in further detail hereinbelow.

Further, and in some embodiments, the generative AI engine may be retrained on a continuous basis, such that the generative AI engine may keep up to date data on current and historical cybersecurity threats, applications and programs files and innerworkings, network security parameters/user device security parameters, and/or the like. Thus, the generative AI engine, through this continuous training, may continuously train and refine itself to accurately, efficiently, and pro-actively prevent cybersecurity threats from being realized in the network and/or on user devices.

As shown in block 308, the process flow 300 may include the step of identifying at least one current security parameter associated with the at least one data security vulnerability. For instance, the at least one current security parameter may refer to a current security protocols and/or current security procedures for dealing with and/or prevent cybersecurity threats. In some embodiments, the current security parameters may comprise applications and/or programs that are designed and installed to prevent and/or handle cybersecurity threats. In some embodiments, the current security parameters may comprise settings and/or rules already configured on the user device(s) within the network. Thus, and in some embodiments, the system may identify each of these current security parameters by accessing and analyzing the user device(s) within the network for their current applications and programs, current settings and protocols, and/or the like, which are used for protecting the security of each device and each device's data, data transmissions, and/or the like.

As shown in block 310, the process flow 300 may include the step of applying the at least one user input, the at least one data security vulnerability, and the at least one current security parameter to the generative AI engine at current instance. For example, the system may identify at least one user input at a user device associated with the network, whereby the user input may comprise a user input or answer to at least one current survey question (which may be part of the at least one current security parameter). In some embodiments, the at least one user input may comprise a user input indicating an application and/or program identifier that the user would like to install at the user device, but may need permission before starting or completing the installation. Such a permission may be given by the entity associated with the network, a manager of the system described herein, and/or the like.

In some embodiments, the at least one data security vulnerability may be identified by the system accessing and analyzing the user device associated with the user input, whereby the analysis of the user device may comprise current security parameters of the user device that may be used to prevent or handle a potential cybersecurity threat if the program or application were installed. In some embodiments, the at least one data security vulnerability may comprise a known cybersecurity threat of the application or program intended to be installed (such as a cybersecurity threat known and disclosed on a website, an article, and/or the like), which the system may determine by employing a web-crawler to identify potential cybersecurity threats for each of this applications and programs already installed or hoped to be installed. In some embodiments, the at least one data security vulnerability may be based on a large language model (LLM) analyzing the web-crawled data and/or comparing and analyzing previous versions of the application and/or program with the current version of the application and/or program, determining the differences between the historical applications/programs and current applications/programs, and analyzing the differences to determine potential cybersecurity threats.

In some instances, and where previous versions of the application or program are different from the current version of the application or program, then the system may generate-using the generative AI engine-a report of the differences between the versions of the application or program. Additionally, and/or alternatively, the generative AI engine, in comparing the versions of the application or program, may generate at least one question based on the differences for the survey which may be transmitted to the user device and/or to a manager of the entity network to determine whether the application or program should be trusted and installed.

In some embodiments, the at least one user input may comprise a feedback input (e.g., a user input) at a feedback survey (which may also be referred to as "survey" in this disclosure). In some such embodiments, the feedback survey may be generated by the generative AI engine, based on the current data of the application or program intended to be installed, current vulnerability(ies) identified by the system if the application or program were installed, historical vulnerabilities, historical applications or programs, historical feedback surveys, historical user inputs, and/or the like. Such an embodiment is further described below with respect to FIG. 4.

In some embodiments, the at least one data security vulnerability may be associated with a threat actor identifier, and wherein the at least one user input is based on a feedback survey generated for the threat actor identifier. By way of non-limiting example, the threat actor identifier may be used by the system in identifying historical cybersecurity threats, historical applications, and/or the like, and determining the third parties to each of these cybersecurity threats and historical applications (e.g., the party that may have manufactured the application or program, and/or the party that may have identified in a hole in the application's cybersecurity protections and used that hole to apply a cybersecurity threat to the application or program. In some embodiments, the system—using the generative AI engine and the threat actor identifier—may generate the feedback survey based on past instances of the third party, thereby tailoring the questions of the survey to address specific potential cybersecurity threats of the third party (e.g., threats of the manufacturer of the application or program and/or threats often seen with the application or program).

As shown in block 312, the process flow 300 may include the step of generating, by the generative AI engine at the current instance, an updated security parameter for the current security parameter. For example, the system may generate—using the generative AI engine—an updated security parameter for the current security parameter, whereby the updated security parameter may comprise updated protocols or rules for the user device and/or an updated feedback survey based on potential cybersecurity threat(s) that may be realized on the user device if the application or program was installed on the user device.

Thus, and in some embodiments, the generative AI engine may look at past or historical security parameters of the user device, historical applications and/or programs and their cybersecurity threats, analyze the current application and/or program and its data to determine potential cybersecurity threats. Further, and based on the potential cybersecurity threats, the system may generate new or updated security parameters for the user device and/or the user devices within the network that may also be affected by the potential cybersecurity threat. Such an updated security parameter may comprise updating questions within the feedback survey for a manager of the network (whereby the question(s) may comprise data regarding the potential cybersecurity threat and whether the pros of the application outweigh the potential cybersecurity threats), a feedback survey for the manufacturer of the application (e.g., asking the manufacturer why changes were made between the versions of the applications, how certain potential cybersecurity threats have been prevented in the application, and/or the like), the user of the user device (which may comprise the same or similar questions as the manager of the network), and/or the like.

As shown in block 314, the process flow 300 may include the step of automatically updating the current security parameter with the updated security parameter. For instance, the system may automatically update the current security parameter with the updated security parameter either upon generating the updated security parameter and/or at a predetermined update time (e.g., at monthly predetermined intervals, the feedback survey may be updated with the updated security parameter). Thus, and in other words, the automatic update of the current security parameter may comprise a pre-determined update time. By way of non-limiting example, the current security parameter may comprise automatic updates with the updated security parameter on a monthly basis or as significant events are detected (e.g., cybersecurity threats are detected) by the generative AI engine, which may ensure that the feedback survey always reflects the most current standards and information without requiring manual or human intervention. Further, and in some embodiments, the automatic update of the current security parameter may be in real time or near real time to the identification of the at least one data security vulnerability (cybersecurity threat).

FIG. 4 illustrates a process flow 400 for generating a feedback survey associated with the at least one user input, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 400.

In some embodiments, and shown in block 402, the process flow 400 may include the step of applying the historical dataset to the generative AI engine, wherein the historical dataset comprises at least one historical feedback survey and at least one historical feedback input. For example, the system may apply the historical dataset to the generative AI engine, whereby the historical dataset further comprises historical feedback survey(s) and associated historical feedback input(s) for the historical feedback survey (s), such that the generative AI engine may be trained on past feedback surveys and past user inputs responding to the feedback surveys. Thus, and in such embodiments, the generative AI engine may be trained to generate its own feedback surveys in response to current potential cybersecurity threats and new applications and programs. Further, and in some embodiments, based on the user inputs as responses to the historical feedback surveys, the system may generate updated feedback surveys upon receiving an initial feedback input(s). Thus, and in some embodiments, the generative AI engine may continuously generate feedback surveys based on recently received feedback inputs, until the cybersecurity threat is handled (e.g., by not installing the application and/or by having the manufacturer of the application update the application to prevent the cybersecurity threat).

In some embodiments, and as shown in block 404, the process flow 400 may include the step of training the generative AI engine with the historical dataset. Thus, and by applying the historical dataset comprising the historical feedback survey(s) and the historical feedback input(s), the generative AI engine may be trained at least at an initial instance. Additionally, and in some embodiments, the generative AI engine may be trained continuously for each historical feedback survey and historical feedback input received and/or identified. Thus, and by applying the historical datasets continuously, the generative AI engine may be kept up to date such that it is refined and accurate in generating feedback surveys and understanding feedback inputs.

In some embodiments, and as shown in block 406, the process flow 400 may include the step of generating, by the generative AI engine, the feedback survey associated with the at least one user input. For example, the system may generate—using the trained generative AI engine—a current feedback survey for the at least one user input, whereby the feedback survey is tailored to the application at issue that is intended for installation, the user device(s) at issue for installation, the current security parameters, and/or the like.

FIG. 5 illustrates a process flow 500 for determining a context of a plurality of data security vulnerabilities and plurality of data security parameters, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, an artificial intelligence engine and/or a generative AI engine (e.g., such as the AI engine shown in FIG. 2), and/or a large language model (e.g., such as that described in FIG. 2) may perform some or all of the steps described in process flow 500.

In some embodiments, and as shown in block 502, the process flow 500 may include the step of generating a security parameter log comprising the historical dataset, a plurality of historical data security vulnerabilities associated with a plurality of data security parameters. For example, and in some embodiments, the system may generate a security parameter log comprising the historical dataset described herein, historical data security vulnerabilities, and data security parameters, whereby the security parameter log comprises an entire snapshot or log of all the data surrounding the data security in a network environment (which may include the data security of each user device).

In some embodiments, and as shown in block 504, the process flow 500 may include the step of determining, by the generative AI engine, a context of plurality of data security vulnerabilities and plurality of data security parameters. For example, and in some embodiments, the system may determine the context of the plurality of data security vulnerabilities, whereby the context may describe the overall story of the cybersecurity threats and attempts and likely intent behind the cybersecurity threats. Thus, and in other words, the system may comprise a historical tracking and analysis log that records all the changes and updates, which may facilitate an understanding of the evolution of specific security concerns over time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automatically generating and updating data security parameters using generative artificial intelligence, the system comprising:

a memory device with computer-readable program code stored thereon;

at least one processing device operatively coupled to the at least one memory device and at least one communication device, wherein executing the computer-readable code is configured to cause the at least one processing device to:

identify a historical dataset comprising at least one historical data security parameter;

apply the historical dataset to a generative artificial intelligence (AI) engine; train the generative AI engine based on the application of the historical dataset to the generative AI engine;

identify at least one user input associated with at least one data security vulnerability;

identify at least one current security parameter associated with the at least one data security vulnerability;

apply the at least one user input, the at least one data security vulnerability, and the at least one current security parameter to the generative AI engine at a current instance;

generate, by the generative AI engine, at least one security questionnaire question based on the at least one data security vulnerability and the at least one current security parameter;

generate, by the generative AI engine at the current instance, an updated security parameter for the current security parameter, wherein the updated security parameter comprises the at least one generated security questionnaire question; and automatically update the current security parameter with the updated security parameter.

2. The system of claim 1, wherein the at least one user input comprises a feedback input at a feedback survey, and wherein the feedback survey is generated by the generative AI engine.

3. The system of claim 2, wherein executing the computer-readable code is further configured to cause the at least one processing device to:

apply the historical dataset to the generative AI engine, wherein the historical dataset comprises at least one historical feedback survey and at least one historical feedback input;

train the generative AI engine with the historical dataset; and generate, by the generative AI engine, the feedback survey associated with the at least one user input.

4. The system of claim 1, wherein the historical dataset comprises external data security standards and internal data security standards.

5. The system of claim 1, wherein the automatic update of the current security parameter comprises a pre-determined update time.

6. The system of claim 1, wherein the automatic update of the current security parameter is in real time or near real time to the identification of the at least one data security vulnerability.

7. The system of claim 1, wherein executing the computer-readable code is further configured to cause the at least one processing device to:

generate a security parameter log comprising the historical dataset, a plurality of historical data security vulnerabilities associated with a plurality of data security parameters; and determine, by the generative AI engine, a context of plurality of data security vulnerabilities and plurality of data security parameters.

8. The system of claim 1, wherein the at least one data security vulnerability is associated with a threat actor identifier, and wherein the at least one user input is based on a feedback survey generated for the threat actor identifier.

9. A computer program product for automatically generating and updating data security parameters using generative artificial intelligence, the computer program product comprising a non-transitory computer-readable medium comprising code causing an apparatus to:

identify a historical dataset comprising at least one historical data security parameter;

apply the historical dataset to a generative artificial intelligence (AI) engine; train the generative AI engine based on the application of the historical dataset to the generative AI engine;

identify at least one user input associated with at least one data security vulnerability;

identify at least one current security parameter associated with the at least one data security vulnerability;

apply the at least one user input, the at least one data security vulnerability, and the at least one current security parameter to the generative AI engine at a current instance;

generate, by the generative AI engine, at least one security questionnaire question based on the at least one data security vulnerability and the at least one current security parameter;

generate, by the generative AI engine at the current instance, an updated security parameter for the current security parameter, wherein the updated security parameter comprises the at least one generated security questionnaire question; and automatically update the current security parameter with the updated security parameter.

10. The computer program product of claim 9, wherein the at least one user input comprises a feedback input at a feedback survey, and wherein the feedback survey is generated by the generative AI engine.

11. The computer program product of claim 10, the computer program product further comprising non-transitory computer-readable medium comprising code causing an apparatus to:

apply the historical dataset to the generative AI engine, wherein the historical dataset comprises at least one historical feedback survey and at least one historical feedback input;

train the generative AI engine with the historical dataset; and generate, by the generative AI engine, the feedback survey associated with the at least one user input.

12. The computer program product of claim 9, wherein the historical dataset comprises external data security standards and internal data security standards.

13. The computer program product of claim 9, wherein the automatic update of the current security parameter comprises a pre-determined update time.

14. The computer program product of claim 9, wherein the automatic update of the current security parameter is in real time or near real time to the identification of the at least one data security vulnerability.

15. A computer implemented method for automatically generating and updating data security parameters using generative artificial intelligence, the computer implemented method comprising:

identifying a historical dataset comprising at least one historical data security parameter;

applying the historical dataset to a generative artificial intelligence (AI) engine; training the generative AI engine based on the application of the historical dataset to the generative AI engine;

identifying at least one user input associated with at least one data security vulnerability;

identifying at least one current security parameter associated with the at least one data security vulnerability;

applying the at least one user input, the at least one data security vulnerability, and the at least one current security parameter to the generative AI engine at a current instance;

generating, by the generative AI engine, at least one security questionnaire question based on the at least one data security vulnerability and the at least one current security parameter;

generating, by the generative AI engine at the current instance, an updated security parameter for the current security parameter, wherein the updated security parameter comprises the at least one generated security questionnaire question; and automatically updating the current security parameter with the updated security parameter.

16. The computer implemented method of claim 15, wherein the at least one user input comprises a feedback input at a feedback survey, and wherein the feedback survey is generated by the generative AI engine.

17. The computer implemented method of claim 16, further comprising:

apply the historical dataset to the generative AI engine, wherein the historical dataset comprises at least one historical feedback survey and at least one historical feedback input;

train the generative AI engine with the historical dataset; and generate, by the generative AI engine, the feedback survey associated with the at least one user input.

18. The computer implemented method of claim 15, wherein the historical dataset comprises external data security standards and internal data security standards.

19. The computer implemented method of claim 15, wherein the automatic update of the current security parameter comprises a pre-determined update time.

20. The computer implemented method of claim 15, wherein the automatic update of the current security parameter is in real time or near real time to the identification of the at least one data security vulnerability.

* * * * *